United States Patent [19]

Breckwoldt

[11] Patent Number: 5,166,333
[45] Date of Patent: Nov. 24, 1992

[54] METHYL HYDROXYPROPYL CELLULOSE ETHERS AND A PROCESS FOR THEIR PRODUCTION

[75] Inventor: Jörn Breckwoldt, Rotenburg, Fed. Rep. of Germany

[73] Assignee: Wolff Walsrode Aktiengesellschaft, Walsrode, Fed. Rep. of Germany

[21] Appl. No.: 694,696

[22] Filed: May 2, 1991

[30] Foreign Application Priority Data

May 11, 1990 [DE] Fed. Rep. of Germany ....... 4015160

[51] Int. Cl.$^5$ .................. C08B 11/193; C08B 11/08
[52] U.S. Cl. ........................................ 536/84; 536/90; 536/91; 536/95; 536/99; 536/124
[58] Field of Search ................... 536/84, 90, 91, 95, 536/99, 124

[56] References Cited

U.S. PATENT DOCUMENTS 4,650,863  3/1987  Felcht et al. ................. 536/90

Primary Examiner—Nathan M. Nutter
Attorney, Agent, or Firm—Sprung Horn Kramer & Woods

[57] ABSTRACT

The new thermoplastic methyl hydroxypropyl cellulose ethers have an average degree of substitution with methyl groups of 1.5 to 2.9 and a molar degree of substitution with hydroxypropyl groups of 1.4 to 1.9.

4 Claims, No Drawings

METHYL HYDROXYPROPYL CELLULOSE ETHERS AND A PROCESS FOR THEIR PRODUCTION

This invention relates to thermoplastic methyl hydroxypropyl cellulose ethers which are soluble in water and organic solvents.

Cellulose ethers which are soluble in water and organic solvents and can be processed like thermoplastics are of advantage for processing and applicational purposes. Hydroxypropyl cellulose ethers which are intended to show these properties at one and the same time are described. However, hydroxypropyl celluloses are attended by the following disadvantages:

a) They are produced by a slurry process. The solvent used has to be recovered (high capital investment).
b) The products only achieve the required properties through a high molar degree of substitution of approximately 4.
c) The reaction cycles for production are very long.
d) The efficiency of the expensive epoxide, propylene oxide, is relatively low at 40 to 50%.

U.S. Pat. No. 3,839,319 describes a process for the production of a methyl hydroxypropyl cellulose (MHPC). The cellulose ethers are said to be thermoplastic and soluble in water and have a degree of substitution DS (methyl) of 0.2 to 1.0 and a molar degree of substitution MS (hydroxypropyl) of at least 1.5. However, the products produced in accordance with U.S. Pat. No. 3,839,319 (see Comparison Example 1) are unsatisfactory in regard to their thermoplasticity. Their softening point of 228° C. is distinctly higher than that of a hydroxypropyl cellulose. The efficiency of the expensive epoxide, propylene oxide, at <20% is unacceptable (serious wastewater pollution).

U.S. Pat. No. 4,614,545 describes methyl hydroxypropyl celluloses which have a methoxyl substitution of 21 to 35% and a hydroxypropyl substitution of 14 to 35%. These cellulose ethers are supposed to not be thermoplastic so that they can be better dried. Their solubility in organic solvents is unsatisfactory (see Table 3, solubilities in ethanol).

U.S. Pat. No. 4,096,325 describes cellulose ethers having a molar substitution of hydroxypropyl groups of 2.5 to 8 and a substitution of methyl groups of 1.0 to 2.4. These products are said to be suitable as thickeners or gelating agents in organic solvents. However, their solubility in water and their low flocculation point are unsatisfactory.

The problem addressed by the present invention was to provide a cellulose ether substituted by methyl and hydroxypropyl groups which would be relatively simple to produce and which would be soluble both in water and in organic solvents and thermoplastically processable.

The present invention relates to thermoplastic cellulose ethers soluble in water and organic solvents, characterized in that the average degree of substitution DS with methyl groups (=DS methyl) is 1.5 to 2.9 and the molar degree of substitution MS (=MS hydroxypropyl) with hydroxypropyl groups is 1.4 to 1.9.

In one preferred embodiment, at least 2 g/100 g solvent of the cellulose ethers dissolve in polar organic solvents at 25° C. to form a clear solution.

Polar organic solvents are understood to be organic solvents bearing polar groups in the molecule in which the heteroatoms nitrogen, sulfur and oxygen are preferably present.

Preferred polar groups are:

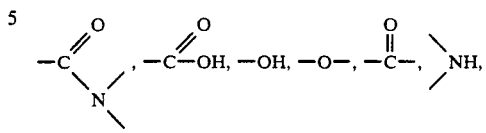

A typical polar organic solvent is ethanol.

It is in the nature of polymers that a "saturated" solution of the cellulose ether is impossible to prepare because any increase in concentration is accompanied for each type of viscosity by an increase in the solution viscosity which finds its limit in technical processability.

In another preferred embodiment, at least 2 g/100 g $H_2O$ dissolve in water at 25° C. to form a clear solution.

In a particularly preferred embodiment, the DS methyl is 2.4 to 2.6 and the MS hydroxypropyl is 1.5 to 1.7.

Particularly preferred cellulose ethers have a thermal flocculation point of at least 30° C. and, more particularly, in the range from 30° to 40° C.

The present invention also relates to a process for the production of a highly substituted methyl hydroxypropyl cellulose ether which is characterized in that it comprises the following steps:

a) formation of an alkali cellulose by reaction of cellulose with alkali
b) reaction of the alkali cellulose with a compound transferring hydroxypropyl groups and
c) methoxylation after hydroxypropylation by addition of a methylating agent.

Ground celluloses, such as bleached linters or chemical wood pulp, are used as starting material for the process according to the invention. The viscosity stages of the products can be established through the choice of the celluloses which have a corresponding average degree of polymerization. Low-viscosity products can be obtained by using celluloses which have been oxidatively degraded by standard methods.

The alkalization of the cellulose and its subsequent etherification may be carried out in the presence of organic solvents in a ratio by weight of solvent to cellulose of preferably 2.5:1 in order to avoid local overheating and to obtain uniformly etherified products. Suitable organic solvents are lower alcohols preferably containing 2 to 4 carbon atoms per molecule and also ethers preferably containing 2 to 4 carbon atoms per molecule or mixtures of these solvents.

For alkalization, the cellulose is sprayed with sodium hydroxide having a concentration of 20 to 50% by weight and preferably 40 to 50% by weight in a quantity of not less than 1.6 mol sodium hydroxide per mol cellulose. According to the invention, the hydroxyalkylating agent is added either before addition of the sodium hydroxide or after the alkalization phase. For etherification, the reaction mixture is heated to temperatures of 50° to 100° C. and preferably to temperatures of 70° to 90° C. and the temperature level adjusted is maintained until the reaction is complete. Before the methylating agent is added, the reaction mixture is cooled, preferably to temperatures below 50° C., and more sodium hydroxide is optionally added. The reaction mixture is then reheated to temperatures of 50° to 100° C. and preferably 70° to 90° C. and the etherification reaction is carried out at that temperature over a period of 1 to 5 hours and preferably over a period of 1.5 to 3 hours. Where an excess of methyl chloride of preferably 6 to 12 mol per mol cellulose is used, a maximum pressure of 18 to 20 bar is established, so that the reaction is carried out in pressure reactors.

In the case of the nonionic derivatives, the crude products thus obtained may be purified by washing with hot water because they have a thermal flocculation point.

The insolubility of the crude products in hot water enables them to be purified with water to a low ash content by comparison with purification using aqueous organic solvents which not only have the disadvantages that they are too expensive, they also complicate the process because they have to be recovered. In addition, it is not possible, even with large quantities of organic solvent, to obtain as low an ash content as with hot water.

Surprisingly, the following desirable properties are combined in a cellulose derivative for methyl hydroxypropyl cellulose having a DS methyl of 1.5 to 2.9 and an MS hydroxypropyl of 1.4 to 1.9 and preferably having a methoxyl DS of 2.4 to 2.6 and a hydroxypropyl MS of 1.5 to 1.7:

1. solubility in cold water,
2. insolubility in hot water
3. solubility in a large number of polar organic solvents,
4. thermoplasticity,
5. excellent film properties,
6. high surface tension,
7. very low ash content.

In the case of the cellulose ethers according to the invention, the abbreviations DS and MS (degree of substitution, molar degree of substitution) have the usual meanings:

Three hydroxyl groups are present in each anhydroglucose unit in the cellulose molecule.

DS is the average number of hydroxyl groups substituted in the cellulose per anhydroglucose unit, MS is the average number of mols of the reactant combined with the cellulose per anhydroglucose unit.

Propylene oxide is the particularly preferred agent for transferring hydroxypropyl groups, although propylene chlorohydrin may also be used.

Particularly preferred methylating agents are methyl chloride and also dimethyl sulfate, methyl bromide, methyl iodide, methane sulfonic acid methyl ester, benzyl-4-sulfonic acid methyl ester, toluene-4-sulfonic acid methyl ester, trifluoromethane sulfonic acid methyl ester.

The cellulose ethers produced in accordance with the invention are soluble in a number of organic solvents. Preferred organic solvents are aliphatic and cycloaliphatic alcohols, such as methanol, ethanol, isopropanol (water content 20%), tert. butanol (water content 10%); aliphatic and cycloaliphatic ethers, such as 1,4-dioxane, tetrahydrofuran; carboxylic acids, such as acetic acid; chlorinated hydrocarbons, such as chloroform, methylene chloride; amines, such as pyridine; amides, such as dimethyl formamide; sulfur-containing organic solvents, such as dimethyl sulfoxide, and aromatic hydrocarbons in conjunction with aliphatic alcohols, such as toluene/ethanol (80/20).

The cellulose ethers produced in accordance with the invention show good film formation. The films are transparent, highly flexible and are insoluble in oils and fats and in gasoline. The films are dissolved by aqueous systems (acids, alkalis) and by a number of organic solvents (see solubility behavior of the cellulose ethers). The methyl hydroxypropyl cellulose films are heat-sealable.

The softening point of a highly substituted methyl cellulose is 293° C. while the softening point of a hydroxypropyl cellulose (MS=4) is 178° C. Now, the thermoplasticity of a methyl hydroxypropyl cellulose could be expected to correspond substantially to the average. It has surprisingly been found that the methyl hydroxypropyl cellulose produced in accordance with the invention with a softening point of 153° C. is more thermoplastic than a hydroxypropyl cellulose.

The solubility of the cellulose ethers according to the invention in organic solvents, more particularly in lower alcohols, can be used to thicken cosmetic articles, lotions, perfumes, etc.; in pickling pastes and in certain printing inks.

By virtue of their very low ash content, the cellulose ethers may be used as thickeners and suspending agents in ceramic pastes. They may also be used with advantage as suspension stabilizers in suspension polymerization.

By virtue of its excellent film properties, methyl hydroxypropyl cellulose is suitable for the production of films.

EXAMPLES

The terms flocculation point and ash content used in the following may be defined as follows:

FLOCCULATION POINT

The flocculation point is determined with 0.5% solutions in a 50 ml glass beaker. The temperature at which clouding first occurs is the flocculation point in °C.

The thermal stability of an MHPC in aqueous systems is tested by determination of the flocculation point.

ASH CONTENT

The sulfate ash is determined by evaporation—in the presence of concentrated $H_2SO_4$—of the MHPC previously washed free from salt and dried, followed by calcination for 1 hour at approximately 600° C. The sulfate ash is a measure of the quality of the purification process.

EXAMPLE 1

Methyl hydroxypropyl cellulose (MHPC)

121.5 g finely ground chemical wood pulp are alkalized with 120 g 50% sodium hydroxide for 60 minutes at room temperature in a 2 liter pressure autoclave purged with inert gas. 152 g propylene oxide are then added to the alkali cellulose. The temperature in the autoclave is slowly increased to 80° C. and kept at that level for 120 minutes. After cooling of the reactor, 180 g sodium hydroxide (prills) and 12 mol methyl chloride per mol cellulose are introduced into the reaction vessel. The reactor is heated to 80° C. over a period of 60 minutes.

After 3 hours, the MHPC is freed from secondary products by washing with hot water and dried.

For a DS (OMe) of 2.63 and an MS (HP) of 1.63, the MHPC formed has a flocculation point of 33° C., as measured in a 0.5% aqueous solution.

The yield of chemicals, based on propylene oxide, is 47%.

COMPARISON EXAMPLE 1

Corresponds to Example 2 of U.S. Pat. No. 3,839,319

127.3 g finely ground cellulose (linters) are alkalized with 88 g 50% sodium hydroxide for 60 minutes at room temperature in a 2 liter pressure autoclave purged with inert gas. After the addition of 510 g propylene oxide and 103 g methyl chloride, the reaction mixture is heated to 70° C. over a period of 90 minutes and kept at that temperature for 3.5 hours. The crude product was washed with hot water until free from chloride.

The MHPC formed had the following degrees of substitution: DS (OMe)=1.03, MS (HP)=2.34.

The yield of chemicals, based on propylene oxide, was only 20.8%.

The properties of the methyl hydroxypropyl cellulose (MHPC) according to the invention produced in accordance with the Example are compared in the following with other cellulose ethers.

Ash content

The MHPC according to Example 1 has a very low ash content (determined as $Na_2SO_4$) of 0.3%. To illustrate this advantage, the ash contents of various cellulose ethers are shown in Table 1.

TABLE 1

| Ash contents of cellulose ethers (CE) | | | |
|---|---|---|---|
| CE | DS | MS | Ash content (as $Na_2SO_4$) |
| HEC |  | 2.5 | <4% |
| MHEC | 1.8 | 0.4 | 1.5% |
| HPC |  | 4 | <0.5% |
| MHPC (invention) | 2.63 | 1.63 | 0.3% |

HEC: obtained in accordance with DE-PS 2 751 411
MHEC: obtained in accordance with EP 0 076 988
HPC: obtained in accordance with US-PS 3,278,521

Surface tension

Aqueous solutions of the MHPC show high surface activity. The reason for this is the simultaneous presence of hydrophilic and hydrophobic substituents. The surface tension of the MHPC according to the invention is compared with that of certain commercial cellulose ethers in Table 2 below. The surface tension was measured by the ring detachment method. This method comprises determining the tension which a spring of a balance must have to detach a ring from a 0.1% cellulose ether solution. A Krüss tensiometer was used for the test.

TABLE 2

| Surface tension of cellulose ethers (taken from E. D. Klug, Food Technology 24 (1970), 51) | | | |
|---|---|---|---|
| CE | DS | MS | Surface tension 0.1% solution [mN/m] |
| CMC | 0.8 |  | 71 |
| HEC |  | 2.5 | 64 |
| MHPC | 1.6–1.7 | 0.1–0.2 | 44–50 |
| MC | 1.8 |  | 47–53 |

TABLE 2-continued

| Surface tension of cellulose ethers (taken from E. D. Klug, Food Technology 24 (1970), 51) | | | |
|---|---|---|---|
| CE | DS | MS | Surface tension 0.1% solution [mN/m] |
| HPC |  | 4 | 45 |
| MHPC (invention) | 2.63 | 1.63 | 40 |

Solubility

The cellulose ethers according to the invention are soluble in a number of organic solvents. To determine solubility, the solvent to be tested was added to 0.6 g of the cellulose ether in a test tube up to a total weight of 30 g. After a residence time of 24 hours on a shaking apparatus, the level of solubility was determined. The superiority of the cellulose ethers according to the invention to other methyl hydroxypropyl celluloses described as organosoluble is clearly apparent from Table 3.

TABLE 3

| Solubilities in EtOH | | | |
|---|---|---|---|
| CE | DS | MS | Solubility in ethanol |
| MHPC (invention) | 2.63 | 1.63 | Soluble |
| MHPC (US-PS 4,614,545 corresponding to Example 1) = Comparison Example 2 | 2.12 | 0.82 | Highly swollen |

Film formation

The new cellulose ethers show good film formation. To prepare films, a 10% solution of the cellulose ether in ethanol was prepared. Films were cast onto glass plates, dried for 1 hour at 50° C. in a recirculating air drying cabinet and removed from the glass plate. The films are clear, highly flexible and are insoluble in oil and gasoline.

The mechanical strengths of the films were determined in accordance with DIN 53 455. The tensile tests were carried out using a Franck-Universal 81565.553 testing machine manufactured by Karl Franck GmbH, Weinheim/Birkenau. The advantages, particularly of the MHPC according to the invention, are shown in Table 4.

TABLE 4

| Mechanical strengths of water-soluble cellulose ether films | | | | | |
|---|---|---|---|---|---|
| CE | DS | MS | Tensile strength [N/mm$^2$] | Elongation at break [%] | E modulus [N/mm$^2$] |
| CMC | 0.9 |  | 37.3 | 10.9 | 35.1 |
| MHEC | 1.4 | 0.2 | 35.3 | 26.3 | 34.6 |
| HEC** |  | 2.5 | 28 | 15–40 |  |
| HPC** |  | 4 | 14 | 56 |  |
| MHPC (invention) | 2.63 | 1.63 | 20.9 | 83.5 | 64 |

**Taken from: E. D. Klug, J. Polymer Sci., Part C, 36 (1977), page 491)

Softening Point

Using an electrically heated microscope (Leitz, Wetzlar), the softening point was determined at a heating rate of 3° C./minute.

A low softening point is advantageous to the processability of thermoplastics. The superiority of the methyl hydroxypropyl celluloses produced in accordance with the invention is apparent from Table 5 below.

TABLE 5

| CE | Softening point |
|---|---|
| HPC | 178° C. |
| MHPC (invention) | 153° C. |
| Comparison Example 1 | 228° C. |
| Comparison Example 2* | 184° C. |

HPC: obtained in accordance with US-PS 3,278,521
*according to US-A 4,614,545, Example 1

I claim:

1. A thermoplastic, water- and organic solvent-soluble methyl hydroxypropyl cellulose ether having an average methyl group degree of substitution DS of 1.5 to 2.9 and a hydroxypropyl group molar degree of substitution MS of 1.4 to 1.9.

2. A product according to claim 1, wherein the methyl group degree of substitution DC is 2.5 to 2.6.

3. A product according to claim 1, wherein the hydroxypropyl MS is 1.5 to 1.7.

4. A film or coating formed of a cellulose ether according to claim 1.

* * * * *